US012626227B2

(12) United States Patent
Shetty et al.

(10) Patent No.: US 12,626,227 B2
(45) Date of Patent: May 12, 2026

(54) DYNAMIC MEETING SPACE CONFIGURATION BASED ON CONTENT

(71) Applicant: Omnissa, LLC, Mountain View, CA (US)

(72) Inventors: Rohit Pradeep Shetty, Bangalore (IN); Ramanandan Nambannor Kunnath, Bangalore (IN)

(73) Assignee: Omnissa, LLC, Mountain View, CA (US)

( * ) Notice: Subject to any disclaimer, the term of this patent is extended or adjusted under 35 U.S.C. 154(b) by 206 days.

(21) Appl. No.: 18/127,701

(22) Filed: Mar. 29, 2023

(65) Prior Publication Data

US 2024/0242182 A1 Jul. 18, 2024

(30) Foreign Application Priority Data

Jan. 18, 2023 (IN) .............................. 202341003606

(51) Int. Cl.
*G06Q 10/109* (2023.01)
*H04L 9/40* (2022.01)
(52) U.S. Cl.
CPC ....... *G06Q 10/109* (2013.01); *H04L 63/0807* (2013.01); *H04L 63/102* (2013.01)
(58) Field of Classification Search
CPC . G06Q 10/109; H04L 63/0807; H04L 63/102; H04L 9/3213
See application file for complete search history.

(56) References Cited

U.S. PATENT DOCUMENTS

2014/0109210 A1* 4/2014 Borzycki ................ G06F 21/32
726/7
2016/0165056 A1* 6/2016 Bargetzi ................ G06F 3/1454
455/416
2017/0054726 A1* 2/2017 Friedmann .......... H04L 63/0428
(Continued)

OTHER PUBLICATIONS

Eiko Yoneki et al., "Dynamic of Inter-Meeting Time in Human Contact Networks," 2009, pp. 1-6. (Year: 2009).*
(Continued)

*Primary Examiner* — Luu T Pham
*Assistant Examiner* — Canh Le
(74) *Attorney, Agent, or Firm* — Kim & Stewart LLP

(57) ABSTRACT

The present disclosure relates to dynamic meeting space configuration based on content. A client device can detect an entry of a user into a meeting space and notify a management service of the entry of the user into the meeting space. The client device can receive an access token from the management service and provide an access request for an enterprise resource to an enterprise resource service, where the access request comprises the access token. The client device can receive the enterprise resource from the enterprise resource service. The client device can provide data regarding the security classification of the enterprise resource to an edge device located within the meeting space. The client device can receive, from the edge device, a confirmation that a plurality of internet of things (IoT) devices located within the meeting space have been configured according to the security classification of the enterprise resource. The client device can provide the enterprise resource to at least one of the IoT devices for exhibition within the meeting space.

15 Claims, 4 Drawing Sheets

(56) References Cited

U.S. PATENT DOCUMENTS

| | | | |
|---|---|---|---|
| 2018/0288089 A1* | 10/2018 | Manthena | G06F 21/552 |
| 2020/0026573 A1* | 1/2020 | Anakkot | G06F 9/5072 |
| 2020/0228497 A1* | 7/2020 | Banerjee | H04L 12/2809 |
| 2020/0412777 A1* | 12/2020 | Araki | H04L 65/1083 |
| 2021/0027208 A1* | 1/2021 | Clark | G06Q 10/109 |
| 2021/0105263 A1* | 4/2021 | Suzuki | H04L 63/0853 |
| 2021/0158304 A1* | 5/2021 | Waldman | H04W 4/025 |
| 2021/0312271 A1* | 10/2021 | Chen | G06N 3/063 |
| 2022/0131878 A1* | 4/2022 | Tokosch | G06F 16/148 |

OTHER PUBLICATIONS

Xiang Zhang et al., "Context Analysis in Intelligent Meeting Scene," 2007, pp. 1-4. (Year: 2007).*

* cited by examiner

DYNAMIC MEETING SPACE CONFIGURATION BASED ON CONTENT

RELATED APPLICATIONS

Benefit is claimed under 35 U.S.C. 119(a)-(d) to Foreign Application Serial No. 202341003606 filed in India entitled "DYNAMIC MEETING SPACE CONFIGURATION BASED ON CONTENT", on Jan. 18, 2023, by VMware, Inc., which is herein incorporated in its entirety by reference for all purposes.

BACKGROUND

Today, enterprise meeting rooms are quickly being transformed into smart meeting spaces filled with internet-of-things (IoT) devices such as a smart displays, smart lighting, smart boards, smart conferencing solutions. Thus, each meeting space can itself be an IoT system where multiple IoT devices are operated by a controller device and may be enrolled with a management system. Thus, participants of meeting sessions held in a meeting space can control or configure each IoT device to suit the needs of the meeting session.

BRIEF DESCRIPTION OF THE DRAWINGS

For a more complete understanding of the embodiments and the advantages thereof, reference is now made to the following description, in conjunction with the accompanying figures briefly described as follows.

DETAILED DESCRIPTION

The present disclosure relates to dynamic meeting space configuration based on content. With the advent of IoT-enabled meeting spaces, employees and other enterprise users are faced physical security concerns when exhibiting secure enterprise content during a meeting session. For example, passersby or other unauthorized persons outside a meeting space could eavesdrop on a meeting session and thereby see or hear secure content being exhibited during the meeting session.

To address these issues, the present disclosure leverages the capabilities of IoT-enabled meeting spaces to maintain the security of enterprise resources exhibited during meeting sessions. In particular, the IoT devices within a meeting space could be dynamically configured to match a level of security necessitated by a particular enterprise resource. One the one hand, if an enterprise resource being exhibited needs no elevated security, meeting participants can have full control over the configurations of the IoT devices. On other hand, if an enterprise resource includes secure content, those IoT devices can be dynamically configured to reduce the chance of that secure content being exposed to unauthorized persons. Likewise, meeting participants may be restricted from changing the IoT devices from their secure configurations.

Figure 1:
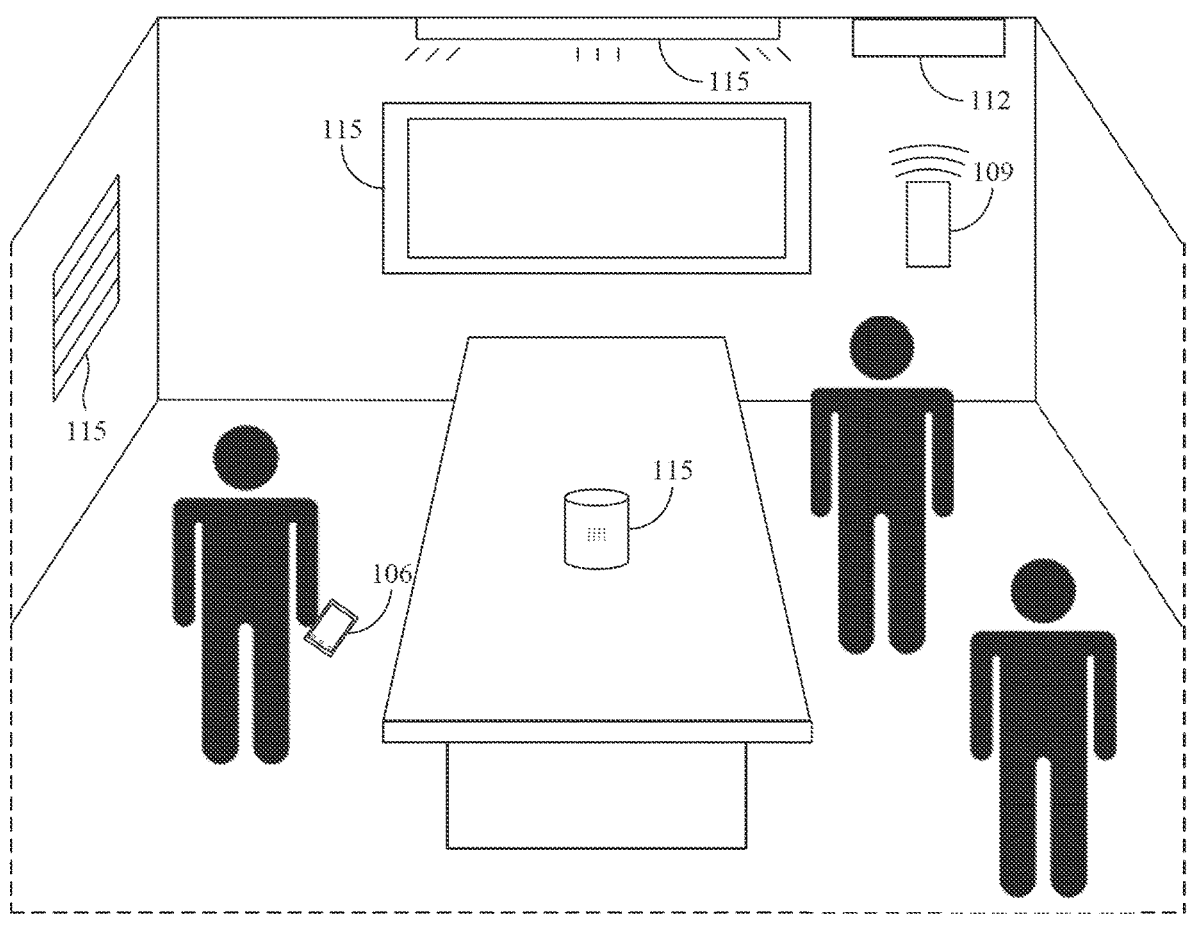
FIG. 1 shows an example of a pictorial diagram illustrating a meeting space, according to various embodiments of the present disclosure.

FIG. 1 is a pictorial diagram illustrating an enterprise meeting space 100. The meeting space 100 can be a room or other similar space in which employees or other persons affiliated with an enterprise can hold a meeting session. The meeting space 100 can host various meeting participants, including a user having a client device 106. The meeting space 100 can be equipped with various devices to facilitate the meeting session, including a beacon device 109, an edge device 112, and various IoT devices 115 (e.g., IoT devices 115a-d). A user in possession of a client device 106 can use an enterprise application installed on the client device 106 to conduct various aspects of the meeting session, including exhibiting one or more enterprise resources 127 (shown in FIG. 2) to the meeting session participants. The beacon device 109 can detect the user's presence in the meeting space 100 via the client device 106. That way, a management service 121 (shown in FIG. 2) can be alerted of the user's presence and permit the user to access enterprise resources 127.

Then, the user can, via the client device 106, communicate with the edge device 112 to operate the IoT devices 115. Using one or more of the IoT devices 115, the user can exhibit the enterprise resource 127 to the meeting participants. For example, the user can display visual elements of the enterprise resource 127 using a display device 115a, or allow participants to hear audio elements of the enterprise resource 127 using a speaker device 115b.

But if the enterprise resource 127 includes any secure content, the configurations of the IoT devices 115 can be modified to preserve security from any passersby or others who may be unauthorized to see or hear the secure content. For example, the brightness of the display device 115a or the audio output volume of the speaker device 115b can be limited. As another example, a lighting device 115c can be dimmed, or window blinds 115d can be closed. These modified configurations can help to reduce the chance of exposure of secure content to unauthorized persons outside the meeting space 100.

Figure 2:
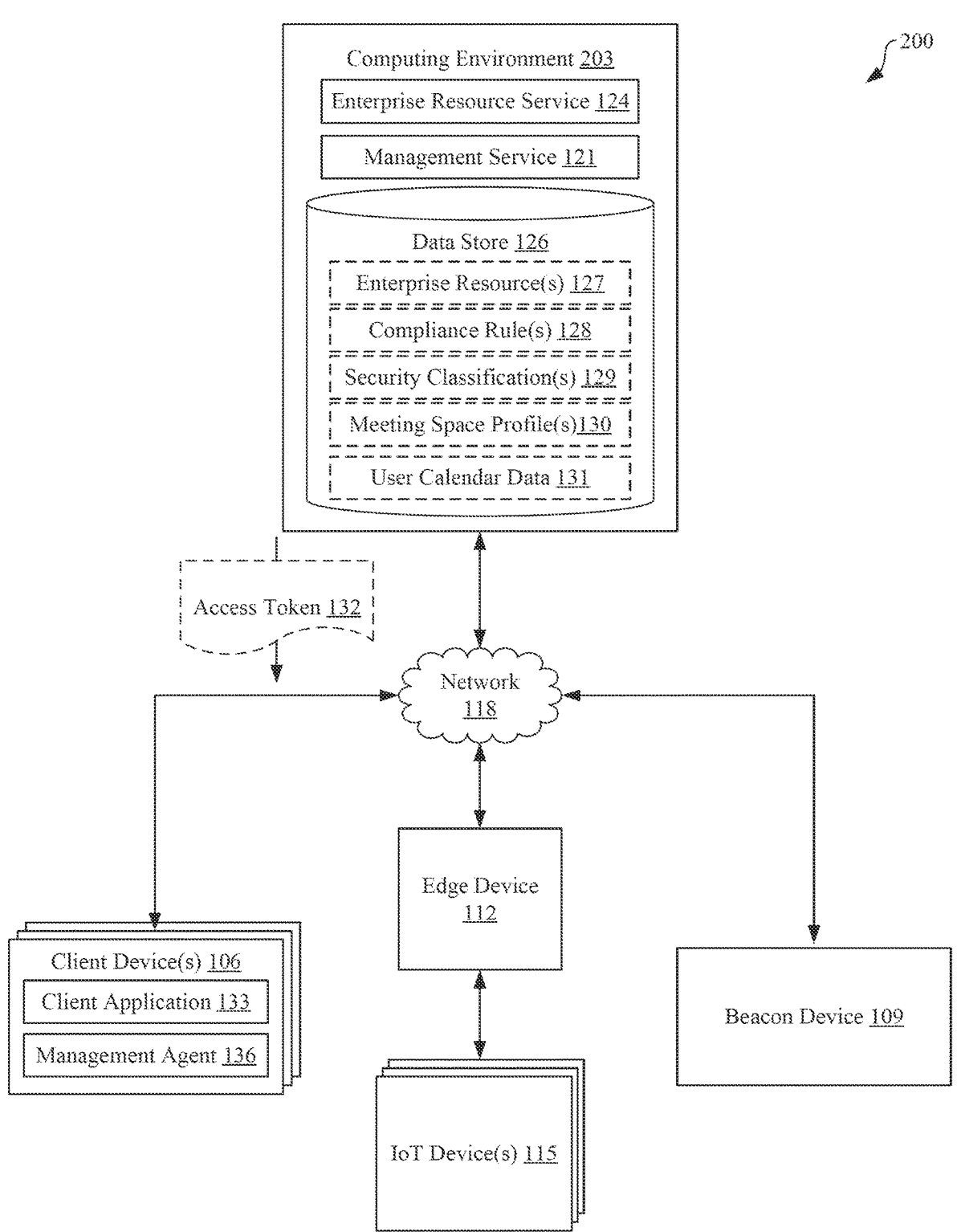
FIG. 2 show an example of a network environment, according to various embodiments of the present disclosure.

FIG. 2, shown is a network environment 200 according to various embodiments. The network environment 200 can include a computing environment 203, one or more client devices 106, the beacon device 109, the edge device 112, and one or more IoT devices 115, which can be in data communication with each other via the network 118.

The network 118 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 118 can also include a combination of two or more networks 118. Examples of networks 118 can include the Internet, intranets, extranets, virtual private networks (VPNs), and similar networks.

The computing environment 203 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 203 can employ a plurality of computing devices that can be arranged in one or more server banks or computer banks or other arrangements. Such computing devices can be located in a single installation or can be distributed among many different geographical locations. For example, the computing environment 203 can include a plurality of computing devices that together can include a hosted computing resource, a grid computing resource or any other distributed computing arrangement. In some cases, the computing environment 203 can correspond to an elastic computing resource where the allotted capacity of processing, network, storage, or other computing-related resources can vary over time.

The computing environment 203 can operate as an environment for mobile device management or a Unified Endpoint Management (UEM) platform that can manage the client device(s) 106 and edge device 112. In that context, the computing environment 203 can execute a management service 121, an enterprise resource service 124, and potentially other applications. The computing environment 203 can also include a data store 126.

The data store 126 can include memory of the computing environment 203, mass storage resources of the computing environment 203, or any other storage resources on which data can be stored by the computing environment 203. The data store 126 can include one or more databases, such as a structured query language (SQL) database, a non-SQL database, or other appropriate database. The data stored in the data store 126, for example, can be associated with the operation of the various applications or functional entities described below. The data store 126 can include one or more enterprise resources 127, one or more compliance rules 128, one or more security classifications 129, one or more meeting space 100 profiles, and potentially other data.

The management service 121 can be executed to administer the operation of client device(s) 106 and edge device(s) 112 that are enrolled or otherwise registered with the management service 121. To that end, the management service 121 can enroll the client device(s) 106 for mobile device management or unified endpoint management (UEM) services. Accordingly, the management service 121 can identify and authenticate one of the client devices 106. In some implementations, the management service 121 can also be registered as a device administrator of the client device 106, permitting the management service 121 to configure and manage certain operating aspects of the client device 106.

In some implementations, the management service 121 can enroll an edge device 112 upon receiving an enrollment request. The enrollment request can either be received from the client device 106 or from the edge device 112 directly. The enrollment request can include, for example, an identifier for the edge device 112 and an identifier for a meeting space 100 associated with the edge device 112. The management service 121 can identify and authenticate the edge device 112 by interacting with the client device 106. In some implementations, the management service 121 can also be registered as a device administrator of the edge device 112, permitting the management service 121 to configure and manage certain operating aspects of the edge device 112. The management service 121 can manage the edge device 112 through the management agent 136.

The management service 121 can be notified by the client device 106 and/or the edge device 112 when a user of the client device 106 is located within a meeting space 100. In some implementations, this notification can include data regarding a user of the client device 106, a meeting session taking place in the meeting space 100, and potentially other information. The management service 121 can verify the information received from the client device 106 and the edge device 112 using user calendar data 131 and Active Directory data. The management service 121 can then determine whether the client device 106 and edge device 112 are compliant with one or more compliance rules 128.

The management service 121 can generate an access token 132. The access token 132 represent the client device's 106 authorization to access an enterprise resource 127. The management service 121 can generate the access token 132 using MICROSOFT ACTIVE DIRECTORY data. In some implementations, the access token 132 can be generated based on user calendar data 131 associated with the user of the client device 106. The user calendar data 131 can include, for example, information from a reservation for the meeting space 100 made by the user, data regarding the meeting session from the user calendar data 131, and other data regarding the meeting session.

The access token 132 can remain valid during the meeting session for which the meeting space 100 has been booked. Thus, the access token 132 can expire based on, for example, a duration or an ending time of the meeting session. In some implementations, the management service 121 can also issue a refresh token that can be used to extend a validity of the access token 132 if a meeting session lasts beyond its reserved ending time or duration. For example, the management service 121 can receive an extension request comprising the refresh token from the client device 106. In response to this extension request, the management service 121 can issue another access token 132 to the client device 106. This new access token 132 may be valid for a predefined amount of time or for an amount of time specified by the extension request.

In some implementations, however, the management service 121 may fail to generate the access token 132. The management service 121 may fail to generate the access token 132 to block a user's request to access the meeting space 100 based on the existence of some inappropriate condition. For example, there could exist a condition that compromises the security of the meeting space 100, information received from the client device 106 and the edge device 112 could be incorrect, or the client device 106 and/or edge device 112 could be out of compliance with one or more of the compliance rules 128. In that case, the management service 121 can notify the user via the user's client device 106 or via one or more of the IoT devices 115. This notification can include the reason(s) why the management service 121 failed to generate the access token 132, including any inappropriate conditions that contributed to the failure.

If the management service 121 successfully generates the access token 132, the management service 121 can provide the access token 132 to the client device 106 and the edge device 112. The management service 121 can receive a request from the client device 106 regarding the security classification of a particular enterprise resource 127. The management service 121 can determine the security classification of the enterprise resource 127 from the security classifications 129. The management service 121 can notify the edge device 112 of the security classification for the enterprise resource 127.

The enterprise resource service 124 can be executed to handle requests to access enterprise resources 127. For example, the enterprise resource service 124 can receive a request to access a particular enterprise resource 127 from client device 106. This request can include an access token 132 that proves the client device's 106 authorization to access the enterprise resource 127. After validating the access token 132, the enterprise resource service 124 can provide the enterprise resource 127 to the client device 106.

The enterprise resource(s) 127 can represent content associated with an enterprise. Enterprise resources 127 can include any electronic data associated with an enterprise, such as databases, applications, text files, word processor files, spreadsheet files, presentation files, graphic files, audio files, photographic files, video files, applications and application files, and/or the like. An enterprise resource 127 can be associated with security classifications 129 that includes a security classification for that enterprise resource 127.

The one or more compliance rules 128 can represent, for example, configurable criteria that must be satisfied for the client device 106 or edge device 112 to be in compliance with the management service 121. The compliance rules 128 can be based on a number of factors, including geographical location, activation status, enrollment status, and authentication data including authentication data obtained by a device registration system, time, and date, and network properties, among other factors associated with each device. The compliance rules 128 can also be determined based on a user account associated with a user of the client device 106. Compliance rules 128 can include predefined constraints that must be met for the management service 121, or other applications, to permit access to the enterprise resources 127. The management service 121 can communicate with management agent 136 to determine whether states exist on the client device 106 or edge device 112 that do not satisfy one or more compliance rules 128. States can include, for example, a virus or malware being detected on the device, violation of a baseline or verified behavior classification, installation or execution of a blacklisted application, and a device being "rooted" or "jailbroken," where root access is provided to a user of the device. Additional states can include the presence of particular files, questionable device configurations, vulnerable versions of applications, vulnerable states of client devices 106 or edge device 112, or other vulnerability, as can be appreciated.

The security classifications 129 can represent data for each enterprise resource 127 regarding a level of security to be implemented within a meeting space 100 where that enterprise resource 127 is being exhibited. A security classification can include, for example, Normal, Secure, and Highly Secure, though other security classifications can be configured by an administrator.

A Normal security classification can indicate that the meeting space 100 may be in an unsecured state, and any IoT devices 115 therein may remain in a default or current configuration when an associated enterprise resource 127 is exhibited. In addition, under a Normal Security classification, a user of the client device 106 (or other user) may have full control over the configuration and operation of the IoT devices 115.

A Secure security classification can indicate that the meeting space 100 must be under some elevated level of security, and the IoT devices 115 can be configured to mitigate any security risks presented by the manner in which the enterprise resource 127 is exhibited. In addition, under a Secure security classification, users may have permissions to exercise partial control over the configuration and operation of the IoT devices 115.

A Highly Secure security classification can indicate that the meeting space 100 must be under a greatest possible level of security, and IoT devices 115 must be in a predefined Highly Secure configuration. Under a Highly Secure security classification, users' permissions for the IoT devices 115 can be highly restricted such that a user must individually override the individual settings of each IoT device's 115 Highly Secure configuration. In some implementations, a user may be prompted using the client device 106 or one of the IoT devices 115 to accept an acknowledgement of the risks involved in changing a IoT device's 115 configuration away from the predefined Highly Secure configuration.

The meeting space 100 profiles 130 can represent the various security configurations for the IoT devices 115 in different meeting space 100. For example, the meeting space 100 profile 130 for a particular meeting space 100 can include the security configurations of each IoT device 115 in that meeting space 100 for each possible security classification 129. In some implementations, the meeting space 100 profiles 130 can further include user permissions for each IoT device 115 under each security configuration. The meeting space 100 profiles 130 can be configured by an administrator.

The calendar data 131 can represent meeting sessions and other events that a user intends to attend. The calendar data 131 can indicate meeting space 100, date, time, any other relevant information concerning a meeting session. When a user adds a new meeting session to the user's calendar or modifies the information concerning an existing meeting session, the client device 106 can provide this information to the management service 121, which can update the calendar data 131 accordingly.

The client device 106 can represent one or more client devices coupled to the network 118. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 106 or can be connected to the primary client device 106 through a wired or wireless connection. The client device 106 can be configured to execute various applications such as a management agent 136 and potentially other applications.

The client application 133 can be executed to access network content served up by the computing environment 203 or other servers or computing devices, thereby rendering a user interface on a display. To this end, the client application 133 can include a browser, a dedicated application, or other executable, and the user interface can include a network page, an application screen, or other user mechanism for obtaining user input. The client device 106 can be configured to execute applications beyond the client application 133 such as email applications, social networking applications, word processors, spreadsheets, or other applications.

The client application 133 can access an enterprise resource 127 using an access token 132 provided by the management agent 136. For example, the client application 133 can provide an access request including the access token 132 to the enterprise resource 127 service. The access request can also include an identifier or locator for the enterprise resource 127. In return, the client application 133 can receive the enterprise resource 127 from the enterprise resource 127 service.

Once the client application 133 accesses an enterprise resource 127, a user of the client device 106 may prompt the client application 133 to cause the enterprise resource 127 to be exhibited using a designated IoT device 115. For example, the user may wish the client application 133 to project or stream the enterprise resource 127 on a IoT device 115 such as a display or a speaker, thereby exhibiting the enterprise resource 127 to all of the participants of the meeting session.

Before exhibiting the enterprise resource 127 on the designated IoT device 115, however, the client application 133 can determine a security classification of the enterprise resource 127. For example, the client application 133 can request information regarding the security classification for enterprise resource 127 from the management service 121 when the user attempts to exhibit the enterprise resource 127. As another example, the client application 133 could have requested this information from the management service 121 before the meeting session began if the client application 133 is able to determine that the particular enterprise resource 127 will be exhibited during the meeting session. For instance, the client application 133 could have made this determination based on the user's calendar data. As yet another example, the client application 133 can itself determine the security classification of the enterprise resource 127. The client application 133 can make this determination based on, for example, keywords in the user's calendar data, information from the meeting space 100 reservation, or the user's calendar data. The client application 133 can attempt to identify keywords that have been associated with previously exhibited enterprise resources 127 classified as Normal, Secure, and Highly Secure.

In some implementations, the client application 133 can notify the edge device 112 of the security classification for the enterprise resource 127. In other implementations, however, the edge device 112 can instead be notified of the security classification for the enterprise resource 127 by the management service 121. The client application 133 can be notified by the management agent 136 or by the edge device 112 directly once the IoT devices 115 are in the appropriate security configuration. The client application 133 can then cause the enterprise resource 127 to be exhibited on the designated IoT device 115.

The management agent 136 can be installed on the client device 106 to facilitate management of the client device 106 by the management service 121. The management agent 136 can be installed with elevated privileges or be effectuated through operating system APIs to manage the primary client device 106 on behalf of the management service 121. The management agent 136 can have the authority to manage data on the primary client device 106; install, remove, or disable certain applications; or install configuration profiles, such as VPN certificates, Wi-Fi profiles, email profiles, or other profiles for configuring various functions or applications of the primary client device 106.

The management agent 136 can detect that the client device 106 has entered a meeting space 100. For example, the management agent 136 can detect a beacon or signal transmitted by a beacon device 109 associated with and/or located within the meeting space 100. In some implementations, the management agent 136 can identify the beacon device 109 based on a universally unique identifier included in the beacon or signal, where unique identifier identifies the beacon device 109 itself or the meeting space 100 within which the beacon device is located.

The management agent 136 can provide the beacon device 109 with information regarding a user of the client device 106. The management agent 136 can likewise receive information regarding the meeting space 100 from the beacon device 109. This information can be exchanged using nearby available peer-to-peer (P2P) channels. The management agent 136 can then notify the management service 121 that the user is located within the meeting space 100.

The management agent 136 can receive an access token 132 from the management service 121. The management agent 136 can then provide that access token 132 to the client application 133 to access an enterprise resource 127. If the access token 132 expires before the meeting session has ended, the management agent 136 can request an extension of the access token 132 from the management service 121.

The management agent 136 can be notified once the edge device 112 has configured the IoT devices 115 according to the security classification of the enterprise resource 127. The management agent 136 can then notify client application 133 that the enterprise resource 127 may be exhibited.

The beacon device 109 can represent a wireless device located within or associated with a particular meeting space 100 that can detect when the client device 106 enters the meeting space 100. To illustrate, the beacon device 109 can generate a beacon or another signal that can be detected by the client device 106. This beacon or signal can include, for example, a near-field communication (NFC), radio frequency identification (RFID), Bluetooth, Bluetooth Low Energy, or other form of wireless communication signal. In some implementations, the beacon or signal can include a universally unique identifier of the beacon device 109 itself or the meeting space 100 within which the beacon device is located. The beacon device 109 can detect a signal received from the client device 106 that includes, for example, an identifier associated with the client device 106.

The beacon device 109 can provide information regarding the meeting space 100 to the client device 106. The beacon device 109 can likewise receive information regarding a user of the client device 106 from the client device 106. This information can be exchanged using nearby P2P channels. The beacon device 109 can then provide the information regarding the user to the edge device 112.

The edge device 112 can be representative of one or more edge devices 112. The edge device 112 can include a processor, network communication hardware, and a memory including executable instructions for communicating with the management service 121, client device 106, beacon device 109, and/or IoT devices 115. The edge device 112 can also be equipped with networking capability or networking interfaces, including a localized networking or communication capability, such as a near-field communication (NFC) capability, radio-frequency identification (RFID) read or write capability, or other localized communication capability. While referred to as an edge device, the edge device 112 can also be representative of routing switches, integrated access devices (IADs), multiplexers, and a variety of metropolitan area network (MAN) and wide area network (WAN) access devices, and other edge devices.

The edge device 112 can coordinate, control, and otherwise manage the IoT devices 115 within a meeting space 100. In some implementations, the edge device 112 can provide network access to the IoT devices 115, as well as implement enrollment processes and gathering IoT metric data based on IoT device 115 communications with the edge device 112. The edge device 112 itself can be managed by the management agent 136 executing on the client device 106.

The edge device 112 can notify the management service 121 when a user (and the user's client device 106) is detected in a meeting space 100. After the beacon device 109 detects and exchanges data with the client device 106 In some implementations, the edge device 112 can provide information regarding a user of the client device 106 to the management service 121. This information can be received from the beacon device 109 after the beacon device 109 detects the user entering the meeting space 100 with the user's client device 106.

The edge device 112 can be enrolled with the management service 121. During setup, the edge device 112 can, in some implementations, provide an enrollment request to the management agent 136 executing on the client device 106, which can in turn provide the enrollment request to the management service 121. In other implementations, however, the edge device 112 provide the enrollment request directly to the management service 121. The enrollment request can include, for example, an identifier for the edge device 112 and an identifier for the meeting space 100. In return, the edge device 112 can receive an enrollment confirmation from the management service 121 or management agent 136. In some implementations, the enrollment confirmation can include a meeting space 100 profile 130 associated with the meeting space 100 corresponding to the edge device 112.

The edge device 112 can be notified of a security classification 129 of an enterprise resource 127. The edge device 112 can be notified of the security classification 129 by the management service 121 or by the client device 106. The edge device 112 can notified of the security classification 129 when a user of the client device 106 attempts to exhibit the corresponding enterprise resource 127 using a IoT device 115. This security classification 129 can be used in configuration of the IoT devices 115.

The edge device 112 can configure the IoT devices 115 according to the security classification 129 of the enterprise resource 127. For each IoT device 115, the edge device 112 can determine what security configuration of that IoT device 115 corresponds to the security classification of the enterprise resource 127. The edge device 112 can make this determination using the meeting space 100 profile 130 for the meeting space 100 in which the IoT devices 115 are located. The meeting space 100 profile 130 can indicate one or more configuration settings corresponding to the enterprise resource's 127 security classification 129 for each IoT device 115.

The edge device 112 can then generate commands to configure each IoT device 115 based on the security classification 129. For example, given an enterprise resource 127 with a Highly Secure security classification 129, the edge device 112 can generate a command to configure a speaker such that its audio output does not exceed a low threshold volume. As another example using the same the enterprise resource 127, the edge device 112 can generate a command to configure a retractable window screen to remain closed. The edge device 112 can then provide each command to its corresponding IoT device 115. In some implementations, the edge device 112 may receive a confirmation from each IoT device 115 once it has been successfully configured. Once the IoT devices 115 have been configured, the edge device 112 can notify the client device 106 that the IoT devices 115 have been configured.

When an exhibited enterprise resource 127 has a Normal security classification, the edge device 112 can maintain the IoT devices 115 in a default or current configuration. Likewise, the edge device 112 can permit a user of the client device 106 (or other user) to exercise unrestricted control over each IoT device 115.

When an exhibited enterprise resource 127 has a Secure security classification 129, the IoT devices 115 can be configured to maintain a consistent level of security among multiple IoT devices 115. For example, in a Secure security classification 129, a retractable window screen can be in a closed configuration when a display is configured to exhibit the Secure the enterprise resource 127. In a Secure configuration, the edge device 112 can partially restrict a user's ability to modify the configurations of the IoT devices 115.

When an exhibited enterprise resource 127 has a Highly Secure security classification, the edge device 112 can configure the IoT devices 115 in a predefined Highly Secure configuration that maintains a highest level of security. While in a Highly Secure configuration, the edge device 112 can restrict a user's ability to modify the Highly Secure configuration settings. For example, the edge device 112 can prevent a user from modifying a configuration setting without the user specifically overriding the setting and indicating the user's acceptance of the risks involved.

IoT devices 115 can comprise appliances, vehicles, sensors, controllers, actuators, and other physical devices including at least: a processor, network communication hardware, and a memory including executable instructions for communicating with an edge device 112. An IoT device 115 can include appliances, vehicles, sensors, controllers, actuators, monitors, phones, tablets, thermostats, speakers, and other devices and can incorporate processor-based systems, such as a computer system or any other device with like capability. An IoT device 115 can also be equipped with networking capability or networking interfaces, including a localized networking or communication capability, such as a near-field communication (NFC) capability, radio-frequency identification (RFID) read or write capability, or other localized communication capability.

An IoT device 115 can include one or more configuration settings. For example, for an IoT device 115 that is an audiovisual device such as a television or monitor, the configuration settings can include a brightness for the IoT device's 115 display, a volume level for the IoT device's 115 audio output, and other settings. As another example, if an IoT device 115 is one capable of obscuring a visibility of the interior of the meeting space 100, such as a retractable screen or window blinds, the configuration settings for the IoT device 115 can include whether the IoT device 115 is closed or open.

The IoT devices 115 can include configurations corresponding to each possible security classification 129. For example, each IoT device 115 can have a configuration corresponding to a Normal security classification 129, a configuration corresponding to a Secure security classification 129, and a configuration corresponding to a Highly Secure security classification 129. For example, a speaker device's Normal security configuration can place no limit on the volume of the audio output. As another example, the speaker device's Secure configuration can limit the volume to 60% or less. As a further example, the speaker device's Highly Secure configuration can limit the volume to 20% or less.

Each IoT device 115 can be configurable by the edge device 112. The configurations the IoT devices 115 can be changed when appropriate to correspond to a security classification 129 of an enterprise resource 127 being exhibited in a particular meeting space 100. An IoT device 115 can receive a command from the edge device 112 that causes the IoT device 115 to assume a configuration corresponding to a specified security classification. As an example, for an audiovisual IoT device 115, a command could instruct the IoT device 115 to lower a brightness of its display or raise a volume of its audio output. As another example, with an IoT device 115 capable of visually obscuring the interior from outside the meeting space 100, a command could instruct the IoT device 115 to open or retract to allow the interior to be visible, or to close or deploy to obscure the interior.

Figure 3A:
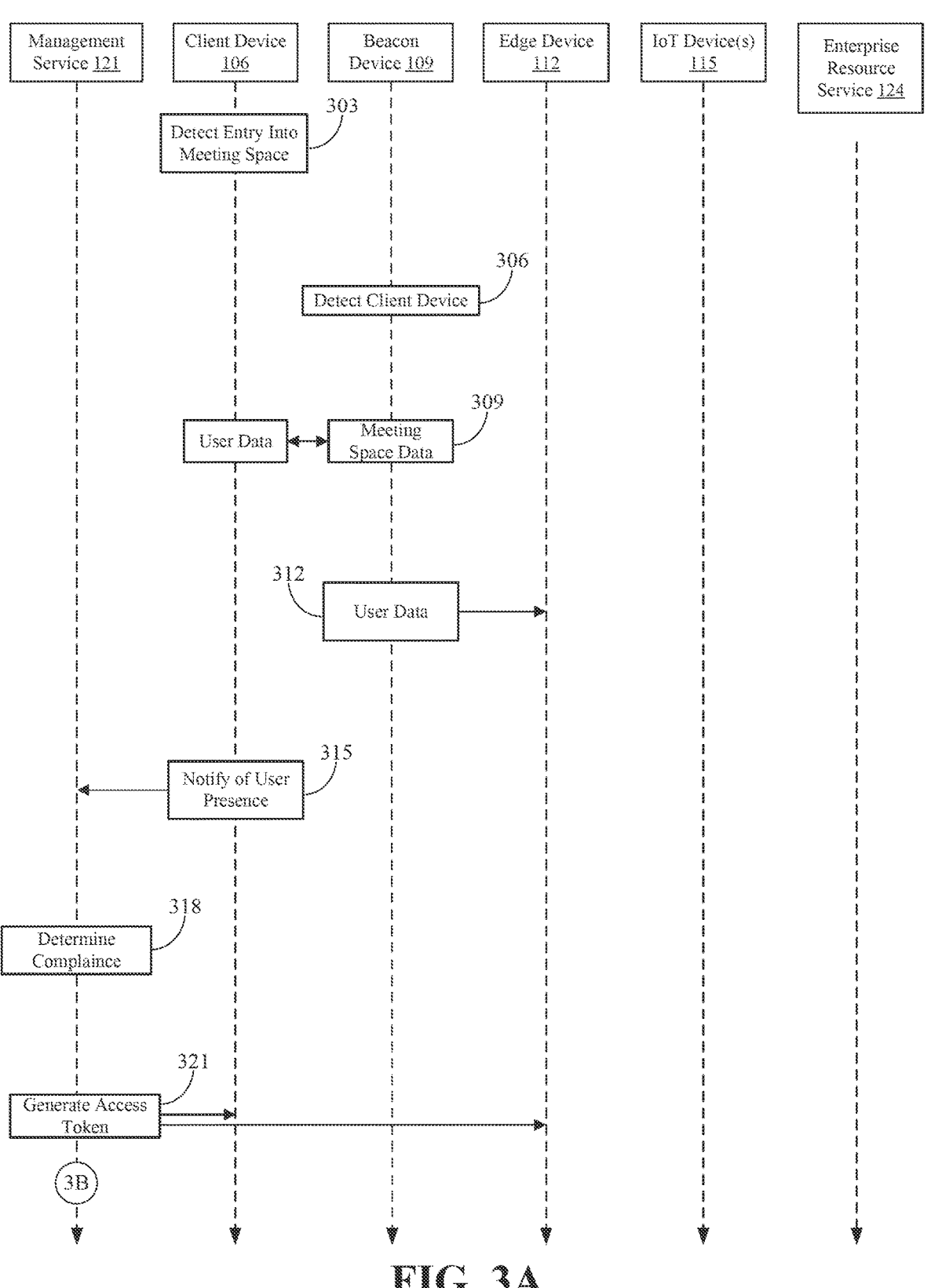
FIGS. 3A-B shown examples of a sequence diagram that provides one example of the interactions between various components of the network environment, according to various embodiments of the present disclosure.
Figure 3B:
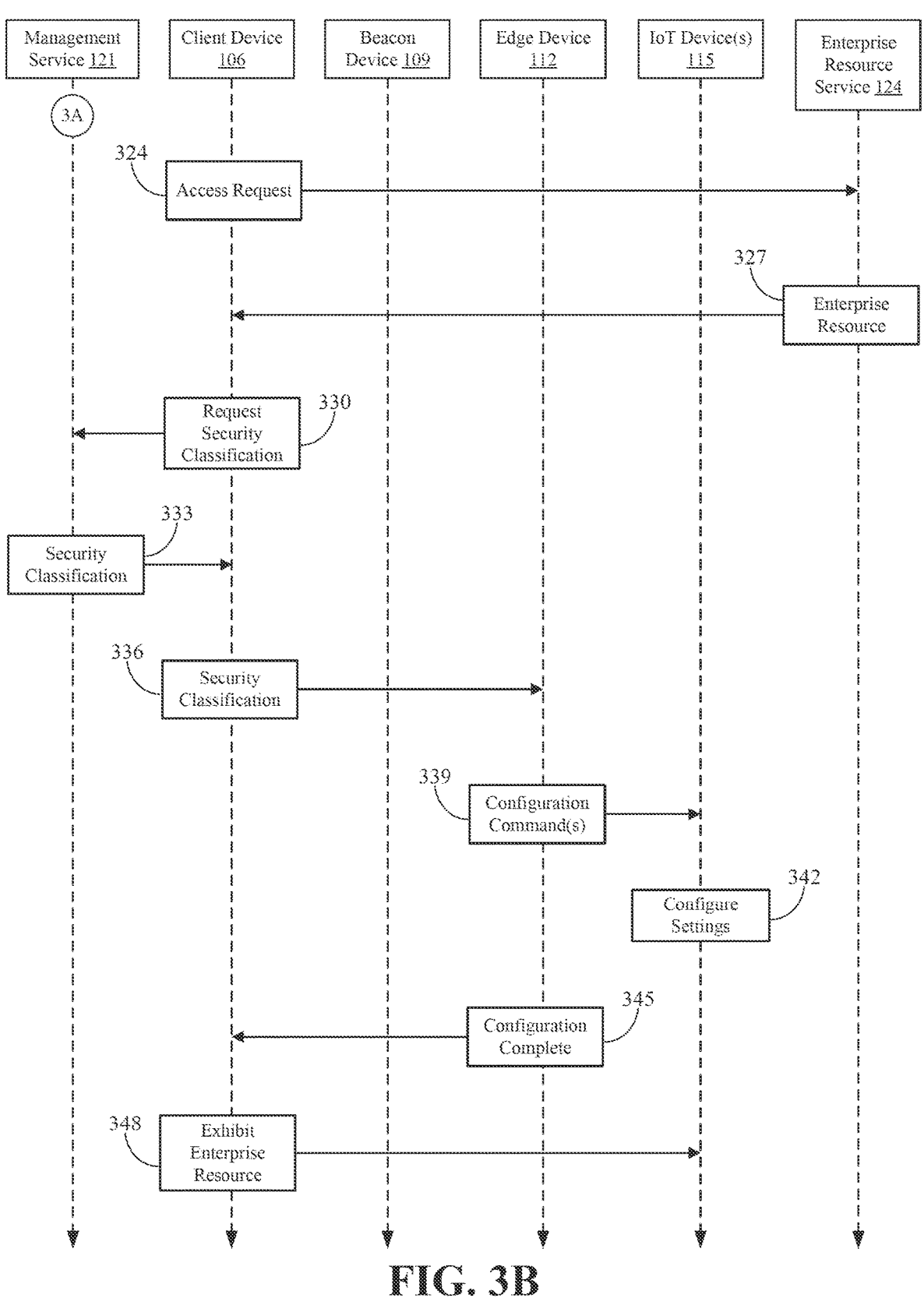

Referring next to FIGS. 3A-B, shown is a sequence diagram that provides one example of the interactions between various components of the network environment 200. The sequence diagram of FIGS. 3A-B provides merely an example of the different types of interactions between the components of the network environment 200. As an alternative, the sequence diagram of FIGS. 3A-B can be viewed as depicting an example of elements of a method implemented within the network environment 200.

At step 303, the client device 106 can detect that it has entered a meeting space. For example, the client device 106 can detect a beacon or signal transmitted by a beacon device 109 associated with and/or located within the meeting space. In some implementations, the client device 106 can identify the beacon device 109 based on a universally unique identifier included in the beacon or signal, where unique identifier identifies the beacon device 109 itself or the meeting space within which the beacon device is located.

At step 306, the beacon device 109 can detect that the client device 106 has entered the meeting space. For example, the beacon device 109 can generate a beacon or other signal like, for example, a near-field communication (NFC), radio frequency identification (RFID), Bluetooth, Bluetooth Low Energy, or other form of wireless communication signal. In some implementations, the beacon or signal can include a universally unique identifier of the beacon device 109 itself or the meeting space 100 within which the beacon device is located. This beacon or other signal can be detected by the client device 106, and the client device 106 can transmit a signal to the client device 106 in return. The signal received from the client device 106 can include, for example, an identifier associated with the client device 106.

At step 309, the client device 106 and the beacon device 109 can exchange data. In particular, the client device 106 can provide the beacon device 109 with data regarding a user of the client device 106, while the beacon device 109 provides the client device 106 with data regarding the meeting space. This information can be exchanged using nearby P2P available channels.

At step 312, the client device 106 can notify the management service 121 that the user is present within the meeting space. This notification can include, for example, data regarding a user of the client device 106, a meeting session taking place in the meeting space 100, and potentially other information. In some implementations, the edge device 112 may also notify the management service 121 receiving user data exchanged at step 209 from the beacon device 109. The management service 121 can verify the information received from the client device 106 (and potentially the edge device 112) using user calendar data 131 and Active Directory data.

At step 315, the management service 121 can determine a compliance of the client device 106 and the edge device 112 with the one or more compliance rules 128. The one or more compliance rules 128 can represent, for example, configurable criteria that must be satisfied for the client device 106 or edge device 112 to be in compliance with the management service 121. The compliance rules 128 can be based on a number of factors associated with each device. The compliance rules 128 can also be determined based on a user account associated with a user of the client device 106. Compliance rules 128 can include predefined constraints that must be met for the management service 121, or other applications, to permit access to the enterprise resources 127.

At step 318, the management service 121 can generate an access token. The access token 132 represent the client device's 106 authorization to access an enterprise resource 127. The management service 121 can generate the access token 132 using MICROSOFT ACTIVE DIRECTORY data. In some implementations, the access token 132 can be generated based on user calendar data 131 associated with the user of the client device 106. The access token 132 can remain valid during the meeting session for which the meeting space 100 has been booked.

At step 321, the client device 106 can provide an access request to the enterprise resource service 124. In the access request, the client device 106 can specify an enterprise resource 127 that a user would like to access. The access request can include the access token 132 to prove the client device's 106 authorization to access the enterprise resource 127. The access request can also include an identifier or locator for the enterprise resource 127.

At step 324, the enterprise resource service 124 can provide the enterprise resource 127 to the client device 106. After validating the access token 132, the enterprise resource service 124 can provide the enterprise resource 127 to the client device 106.

At step 327, the client device 106 can request data regarding a security classification 129 of the enterprise resource 127. In some implementations, the client device 106 can make this request following a user attempt to exhibit the enterprise resource 127 using one of the IoT devices 115.

At step 330, the management service 121 can determine the security classification 129 of the enterprise resource 127. The security classifications 129 can represent data for the enterprise resource 127 regarding a level of security to be implemented within the meeting space 100 where the enterprise resource 127 is being exhibited. A security classification 129 can include, for example, Normal, Secure, and Highly Secure, though other security classifications can be configured by an administrator. The management service 121 can then provide data regarding the enterprise resource's 127 security classification 129 to the edge device 112.

At step 333, the client device 106 can provide the data regarding the enterprise resource's 127 security classification 129 to the edge device 112. That way, the IoT devices 115 can be configured according to the enterprise resource's 127 security classification 129.

At step 336, the edge device 112 can generate command(s) to configure one or more IoT devices 115 based on the security classification 129. For example, given an enterprise resource 127 with a Highly Secure security classification 129, the edge device 112 can generate a command to configure an IoT device 115 at its highest security setting. As another example, for a Normal security classification 129, the edge device 112 can generate a command to configure the IoT devices 115 in a default configuration, or the edge device 112 may simply refrain from providing a command and allow the IoT devices 115 to remain in a current configuration. The edge device 112 can then provide each command to its corresponding IoT device 115. In some implementations, the edge device 112 may receive a confirmation from each IoT device 115 once it has been successfully configured.

At step 339, the one or more IoT devices 115 can be configured according to the security classification 129 of the enterprise resource 127. As an example, for an audiovisual IoT device 115, a command could instruct the IoT device 115 to lower a brightness of its display or raise a volume of its audio output. As another example, with an IoT device 115 capable of visually obscuring the interior from outside the meeting space 100, a command could instruct the IoT device 115 to open or retract to allow the interior to be visible, or to close or deploy to obscure the interior.

At step 342, the edge device 112 can notify the client device 106 that the IoT devices 115 have been configured. In some implementations, the edge device 112 can indicate the settings to which each IoT device 115 has been configured, any restrictions on whether or how a user can change these configuration settings, or other information regarding the configuration of the IoT devices 115.

At step 345, the client device 106 can cause the enterprise resource 127 to be exhibited using one or more of the IoT devices 115. For example, the client device 106 cast or stream a visual representation of the enterprise resource 127 to a display IoT device 115, or the client device 106 can cast or stream audio components of the enterprise resource 127 to a speaker IoT device 115.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random-access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 203.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

What is claimed is:

1. A system comprising:

at least one computing device comprising a processor and a memory; and machine-readable instructions stored in the memory that, when executed by the processor, cause the at least one computing device to at least:

detect an entry of a user into a meeting space based on a client device that has been registered for management with a management service;

provide, to the management service, a notification of the entry of the user into the meeting space, the notification including data identifying the user of the client device and a meeting session scheduled in the meeting space, wherein the management service generates an access token to indicate the client device's authorization to access an enterprise resource based on the data identifying the user of the client device;

receive, from the management service, the access token and provide an access request for the enterprise resource to an enterprise resource service, the access request including the access token;

receive the enterprise resource from the enterprise resource service;

detect a request to display or exhibit the enterprise resource in the meeting space during the meeting session;

receive, from the management service in response to the request, data regarding a security classification of the enterprise resource, wherein the security classification indicates a level of security to be implemented within the meeting space where the enterprise resource is being displayed or exhibited during the meeting session;

provide the data regarding the security classification of the enterprise resource to an edge device located within the meeting space, wherein providing the data causes the edge device to generate one or more commands that enable, disable or configure functionality of a plurality of internet of things (IoT) devices located within the meeting space according to the security classification of the enterprise resource to enforce the level of security to be implemented within the meeting space where the enterprise resource is being displayed or exhibited during the meeting session;

receive, from the edge device, a confirmation that the plurality of IoT devices have been configured according to the security classification of the enterprise resource; and provide the enterprise resource to at least one of the IoT devices for display or exhibition within the meeting space.

2. The system of claim 1, wherein the machine-readable instructions, when executed by the processor, further cause the computing device to at least:

provide data associated with the user to a beacon device located within the meeting space; and receive data associated with the meeting space from the beacon device.

3. The system of claim 1, wherein the access request comprises an identifier for an enterprise resource and the access token.

4. The system of claim 1, wherein the machine-readable instructions, when executed by the processor, further cause the computing device to at least receive a refresh token corresponding to the access token from the management service.

5. The system of claim 1, wherein detecting the entry of the user into the meeting space further comprises:

detecting, by the client device, a signal of a beacon device that includes a unique identifier of the beacon device or the meeting space;

transmitting an identifier of the client device to the beacon device; and receiving, by the client device from the beacon device, data regarding the meeting space.

6. A method, comprising:

detecting an entry of a user into a meeting space based on a client device that has been registered for management with a management service;

providing, to the management service, a notification of the entry of the user into the meeting space, the notification including data identifying the user of the client device and a meeting session scheduled in the meeting space, wherein the management service generates an access token to indicate the client device's authorization to access an enterprise resource based on the data identifying the user of the client device;

receiving, from the management service, the access token and providing an access request for the enterprise resource to an enterprise resource service, the access request including the access token;

receiving the enterprise resource from the enterprise resource service;

detecting a request to display or exhibit the enterprise resource in the meeting space during the meeting session;

receiving, from the management service in response to the request, data regarding a security classification of the enterprise resource, wherein the security classification indicates a level of security to be implemented within the meeting space where the enterprise resource is being displayed or exhibited during the meeting session;

providing the data regarding the security classification of the enterprise resource to an edge device located within the meeting space, wherein providing the data causes the edge device to generate one or more commands that enable, disable or configure functionality of a plurality of internet of things (IoT) devices located within the meeting space according to the security classification of the enterprise resource to enforce the level of security to be implemented within the meeting space where the enterprise resource is being displayed or exhibited during the meeting session;

receiving, from the edge device, a confirmation that the plurality of IoT devices have been configured according to the security classification of the enterprise resource; and providing the enterprise resource to at least one of the IoT devices for display or exhibition within the meeting space.

7. The method of claim 6, further comprising:

providing data associated with the user to a beacon device located within the meeting space; and receiving data associated with the meeting space from the beacon device.

8. The method of claim 6, wherein the access request comprises an identifier for an enterprise resource and the access token.

9. The method of claim 6, further comprising receiving a refresh token corresponding to the access token from the management service.

10. The method of claim 6, wherein detecting the entry of the user into the meeting space further comprises:

detecting, by the client device, a signal of a beacon device that includes a unique identifier of the beacon device or the meeting space;

transmitting an identifier of the client device to the beacon device; and receiving, by the client device from the beacon device, data regarding the meeting space.

11. A non-transitory computer-readable medium embodying program instructions that, when executed by a computing device, cause the computing device to at least:

detect an entry of a user into a meeting space based on a client device that has been registered for management with a management service;

provide, to the management service, a notification of the entry of the user into the meeting space, the notification including data identifying the user of the client device and a meeting session scheduled in the meeting space, wherein the management service generates an access token to indicate the client device's authorization to access an enterprise resource based on the data identifying the user of the client device;

receive, from the management service, the access token and provide an access request for the enterprise resource to an enterprise resource service, the access request including the access token;

receive the enterprise resource from the enterprise resource service;

detect a request to display or exhibit the enterprise resource in the meeting space during the meeting session;

receive, from the management service in response to the request, data regarding a security classification of the enterprise resource, wherein the security classification indicates a level of security to be implemented within the meeting space where the enterprise resource is being displayed or exhibited during the meeting session;

provide the data regarding the security classification of the enterprise resource to an edge device located within the meeting space, wherein providing the data causes the edge device to generate one or more commands that enable, disable or configure functionality of a plurality of internet of things (IoT) devices located within the meeting space according to the security classification of the enterprise resource to enforce the level of security to be implemented within the meeting space where the enterprise resource is being displayed or exhibited during the meeting session;

receive, from the edge device, a confirmation that the plurality of IoT devices have been configured according to the security classification of the enterprise resource; and provide the enterprise resource to at least one of the IoT devices for display or exhibition within the meeting space.

12. The non-transitory computer-readable medium of claim 11, wherein the program instructions, when executed, further cause the computing device to at least:

provide data associated with the user to a beacon device located within the meeting space; and receive data associated with the meeting space from the beacon device.

13. The non-transitory computer-readable medium of claim 11, wherein the machine-readable instructions, when executed, further cause the computing device to at least:

receive a refresh token corresponding to the access token from the management service.

14. The non-transitory computer-readable medium of claim 13, wherein the access request comprises an identifier for an enterprise resource and the access token.

15. The non-transitory computer-readable medium of claim 11, wherein detecting the entry of the user into the meeting space further comprises:

detecting, by the client device, a signal of a beacon device that includes a unique identifier of the beacon device or the meeting space;

transmitting an identifier of the client device to the beacon device; and receiving, by the client device from the beacon device, data regarding the meeting space.

* * * * *